US008414129B2

(12) United States Patent
Park et al.

(10) Patent No.: US 8,414,129 B2
(45) Date of Patent: Apr. 9, 2013

(54) OPTICAL SYSTEM

(75) Inventors: Jae-hyun Park, Seoul (KR); Jeong-ho Nho, Suwon-si (KR); Sung-tae Kim, Seoul (KR); Won-yong Lee, Suwon-si (KR); Yong-dok Cha, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 12/618,823

(22) Filed: Nov. 16, 2009

(65) Prior Publication Data

US 2011/0001936 A1 Jan. 6, 2011

(30) Foreign Application Priority Data

Jul. 3, 2009 (KR) ........................ 10-2009-0060678

(51) Int. Cl.
*G03B 21/28* (2006.01)

(52) U.S. Cl.
USPC ........... 353/33; 353/37; 648/744; 648/E9.027

(58) Field of Classification Search .............. 330/30, 330/31, 33, 37; 348/744, E9.027, E9.026; 353/30, 31, 33, 37

See application file for complete search history.

(56) References Cited

U.S. PATENT DOCUMENTS 5,283,602 A * 2/1994 Kwon .............................. 353/69
2004/0169823 A1 * 9/2004 Bridgwater et al. ............ 353/30
2006/0050515 A1 * 3/2006 Fujinawa et al. ............. 362/294
2006/0126155 A1 6/2006 Kowarz et al.
2006/0215129 A1 * 9/2006 Alasaarela et al. ............. 353/94
2006/0274284 A1 * 12/2006 Peterson et al. ................ 353/84
2006/0279710 A1 * 12/2006 Tani ............................... 353/85
2007/0132956 A1 * 6/2007 Whitehead et al. ............. 353/30
2007/0247599 A1 * 10/2007 Kadowaki et al. ............ 353/101

FOREIGN PATENT DOCUMENTS

| DE | 10-2004-010913 A1 | 9/2005 |
| EP | 0 985 952 A1 | 3/2000 |
| WO | 2006/130724 A2 | 12/2006 |

OTHER PUBLICATIONS

Search Report dated Jul. 1, 2010 from the European Patent Office in counterpart application EP 09176802.8.

* cited by examiner

*Primary Examiner* — John Lee
(74) *Attorney, Agent, or Firm* — Sughrue Mion, PLLC (57) ABSTRACT

An optical system is provided. The optical system includes a luminous system which comprises a plurality of light source devices and an image unit; and a projection system which receives light having an image through the luminous system, and enlarges and projects the light, wherein the plurality of light source devices comprise a reflection member which reflects light beam emitted from the light source devices, and are disposed so that the light beam emitted from the light source devices is reflected by the reflection member one time and enters to the image unit.

11 Claims, 8 Drawing Sheets

OPTICAL SYSTEM

CROSS-REFERENCE TO RELATED APPLICATIONS

This application claims priority under 35 U.S.C. §119 from Korean Patent Application No. 10-2009-0060678, filed on Jul. 3, 2009, in the Korean Intellectual Property Office, the disclosure of which is incorporated herein by reference in its entirety.

BACKGROUND OF THE INVENTION

1. Field of the Invention

Apparatuses consistent with the present invention relate to an optical system, and more specifically to an optical system in which component layout is improved so that a device can be minimized.

2. Description of the Related Art

An optical system is generally used for an image display apparatus such as a beam projector or a projection television, and is used to project an image which is formed on a display module without emitting light by itself, such as a thin film transistor liquid crystal display (TFT-LCD) or a digital micro-mirror device (DMD).

An optical system is divided into a luminous system which includes one or more light sources and an image unit, and a projection system which projects an image and light emitted from the luminous system.

The luminous system may be configured to have a single light source or three-color light sources emitting Red, Green, Blue (RGB) colors, or more light sources depending on the type of the image unit.

In the case of an image unit which needs three-color light sources such as a TFT-LCD, if the three-color light sources are disposed in parallel to each other in a rear portion of the image unit, the length of the device is increased. Accordingly, it is difficult to miniaturize a device such as a pocket projector which requires three-color light sources.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an optical system in which layout of components is improved so that a device is miniaturized.

An aspect of the present invention provides an optical system, including a luminous system having a plurality of light source devices and an image unit; and a projection system which receives light having an image through the luminous system, and enlarges and projects the light, wherein each of the plurality of light source devices includes a reflection member which reflects a light beam emitted from the light source device, and the light source and reflection member are disposed so that the light beam emitted from the light source device is reflected by the reflection member one time and enters the image unit.

According to first and third exemplary embodiments of the present invention, the reflection member may be disposed so that each light beam emitted from the plurality of light source devices is reflected in the same direction.

According to second and fourth exemplary embodiments of the present invention, the projection system may include an image reflection member which reflects light having an image projected from the image unit one time.

According to a fifth exemplary embodiment of the present invention, there is provided an optical system, including a luminous system which includes a plurality of light source devices having a light beam generator and a reflection member which reflects a light beam; and an image unit; and a projection system which enlarges and projects light having an image through the luminous system, wherein the plurality of light source devices are disposed so that the height of the light beam generator is different from that of the image unit, and the light beam emitted from the light source devices is reflected by the reflection member one time and enters to the image unit.

The light beam generator may be disposed over the image unit, and the projection system may include an image reflection member which reflects light having an image projected from the image unit one time.

According to a sixth exemplary embodiment of the present invention, the image reflection member may reflect the light having the image projected from the image unit in a direction parallel to the light beams projected from the light beam generators one time.

The projection system may include a projection lens, wherein the projection lens projecting the light having the image is disposed in the height different from that of the image unit, and the projection lens may be disposed over the image unit.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

A feature of the present invention lies in a placement of first, second, and third light source devices 110, 120, 130 included in a luminous system 100 and a projection system 200.

Figure 1:
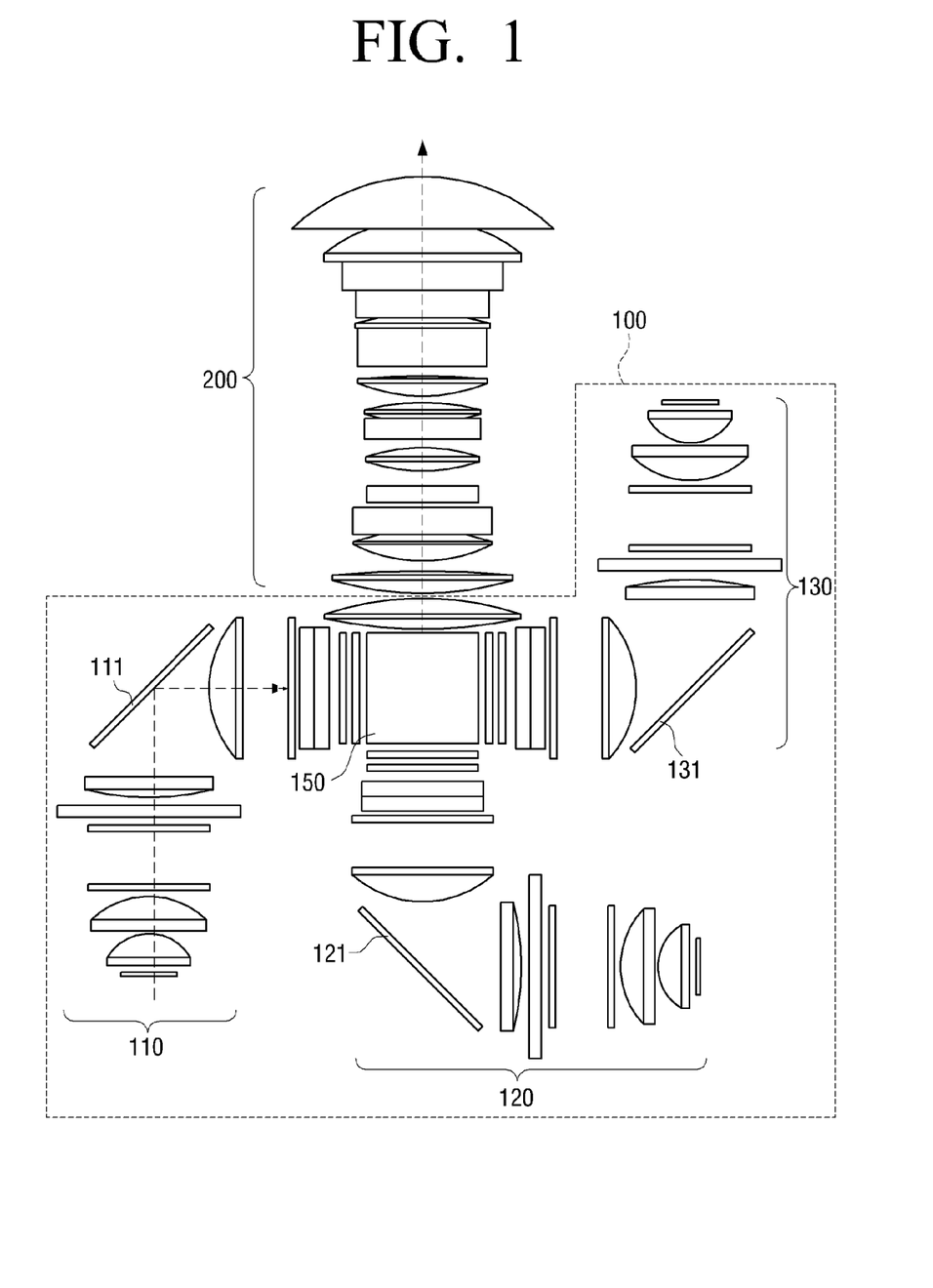
FIG. 1 is a schematic view illustrating an optical system according to a first exemplary embodiment of the present invention.

FIG. 1 is a schematic view illustrating an optical system according to the first exemplary embodiment of the present invention.

Referring to FIG. 1, the optical system according to the first exemplary embodiment of the present invention is divided into the luminous system 100 and the projection system 200.

The luminous system 100 comprises the first, second, and third light source devices 110, 120, 130, first, second, and third reflection mirrors 111, 121, 131 and an image unit 150. The first, second, and third light source devices 110, 120, 130 are configured for each color of Red, Green, Blue (RGB), and the first, second, and third reflection mirrors 111, 121, 131 as a reflection member, reflect light beams emitted from the first, second, and third light source devices 110, 120, 130 one time and the image unit 150 is configured to receive incident light beams through the first, second, and third reflection mirrors 111, 121, 131. The projection system 200 enlarges and projects light having an image of the luminous system 100 on a screen (not shown).

The first, second, and third reflection mirrors 111, 121, 131 are disposed to reflect light beam emitted from the first, second, and third light source devices 110, 120, 130 in the same direction one time. That is, the light beam of the first light source device 110 is reflected through the first reflection mirror 111 in the right direction of the light beam and thus enters into the image unit 150 as shown in FIG. 1, and also the light beam of the second and third light source devices 120, 130 is reflected through the second and third reflection mirrors 121, 131 in the right direction of the light beam and thus enters into the image unit 150.

According to the above exemplary embodiment of the present invention, as the first and third light source devices 110, 130 are disposed so that the paths on which their light beams proceed are antiparallel to each other, while the path on which the light beam from the second light source 120 proceeds is perpendicular to those of the light beams from the first and third light sources. Thus, extra space available in a body of the optical system is maximized and thus the space required to mount the first, second, and third light source devices 110, 120, 130 may be minimized.

Figure 2:
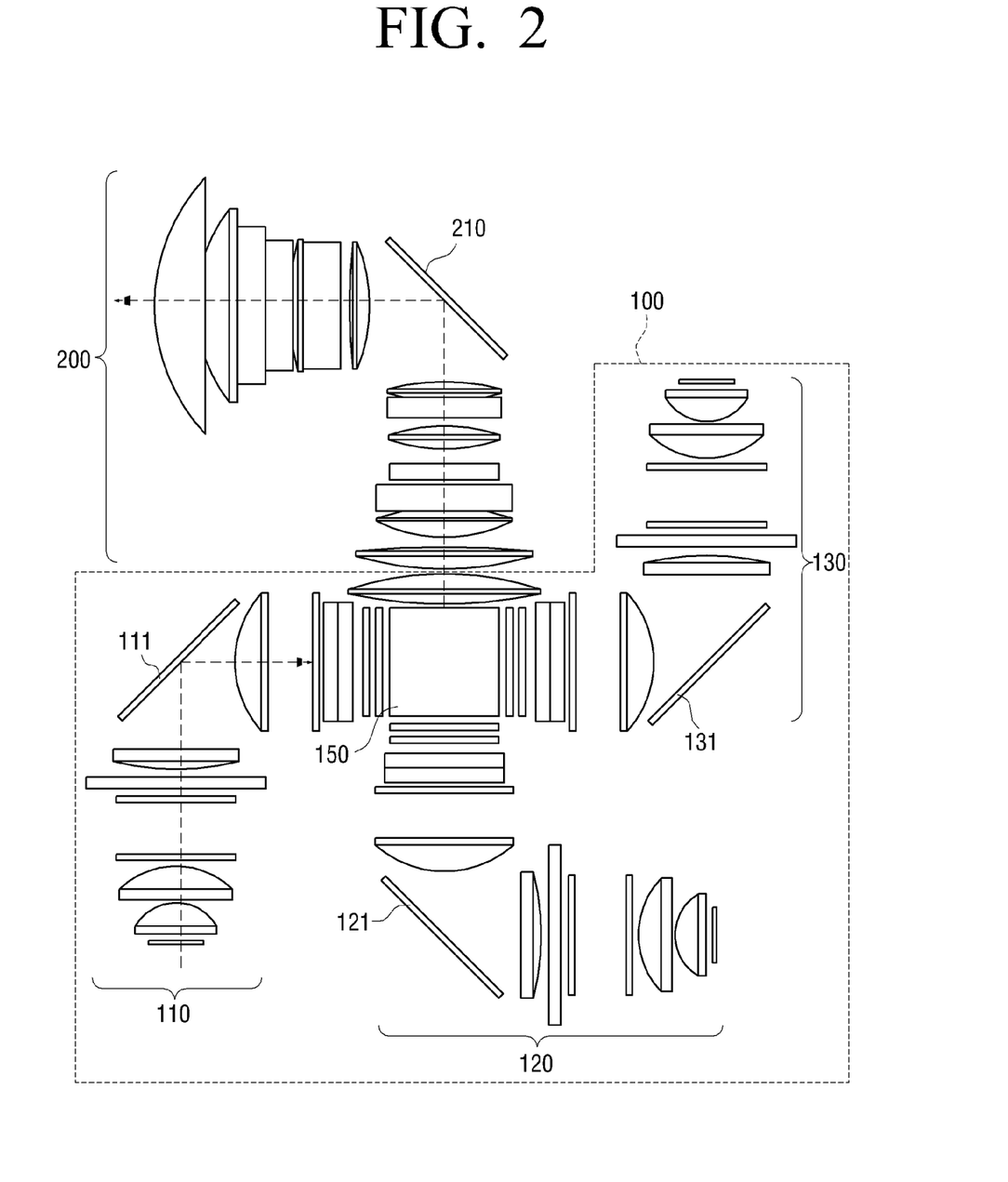
FIG. 2 is a schematic view illustrating an optical system according to a second exemplary embodiment of the present invention.

FIG. 2 is a schematic view illustrating an optical system according to a second exemplary embodiment of the present invention. According to the second exemplary embodiment of the present invention, in addition to the first, second, and third light source devices 110, 120, 130 in the luminous system 100 according to the first exemplary embodiment of the present invention, a fourth reflection mirror 210 is mounted in the projection system 200 as an image reflection member, and may reflect light having an image projected from the image unit 150 one time and project the light on a screen (not shown). The fourth reflection mirror 210 reflects the light having the image in the left direction of the proceeding light.

Compared with the first exemplary embodiment of the present invention, the second exemplary embodiment of the present invention may additionally reduce the space for the projection system 200, and thus the space required to mount the first, second, and third light source devices 110, 120, 130 and a body of the projection system 200 may be minimized.

Figure 3:
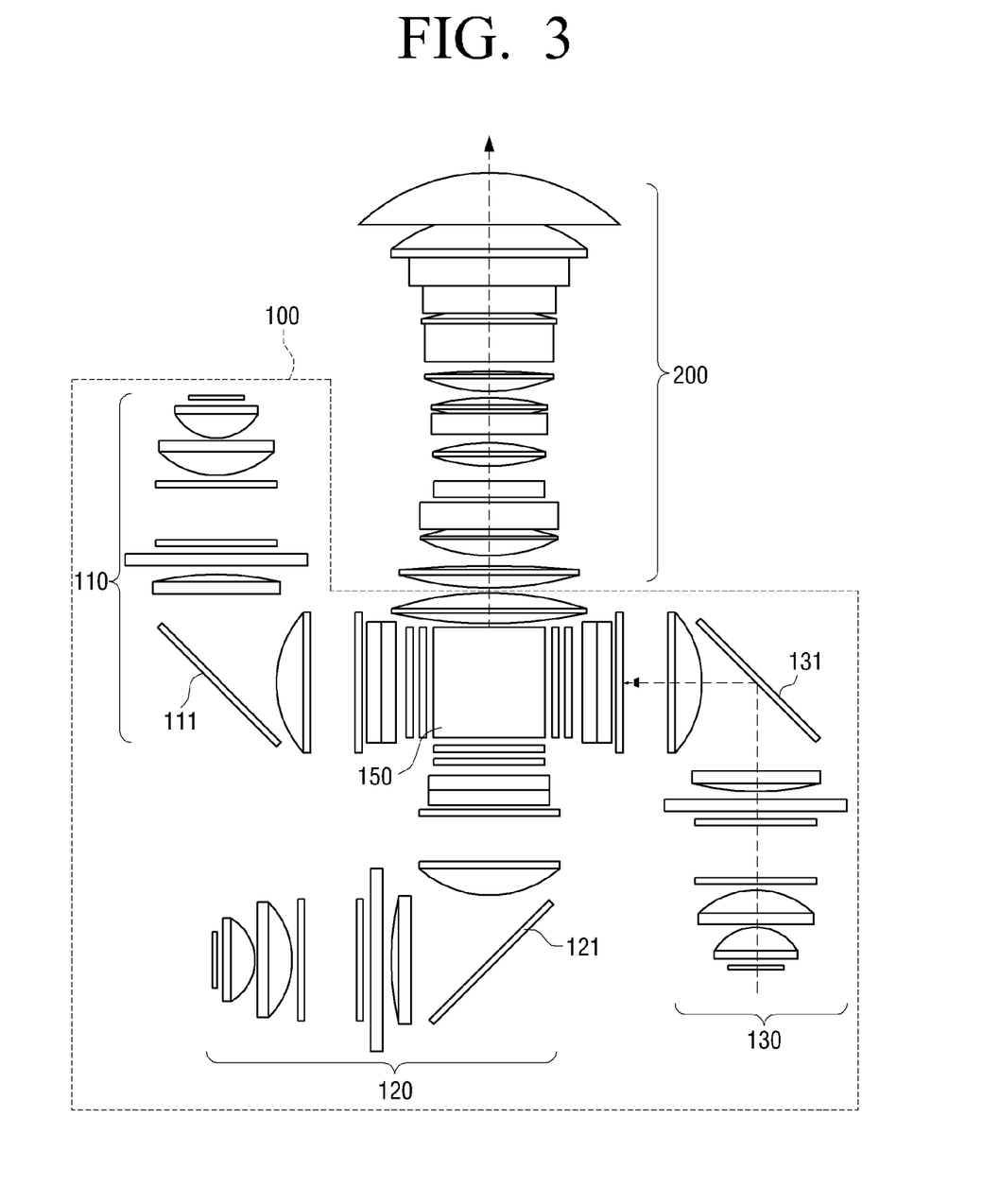
FIG. 3 is a schematic view illustrating an optical system according to a third exemplary embodiment of the present invention.

FIG. 3 is a schematic view illustrating an optical system according to a third exemplary embodiment of the present invention. According to the third exemplary embodiment of the present invention, each of the first, second, and third light source devices 110, 120, 130 comprises the first, second, and third reflection mirrors 111, 121, 131 respectively which reflect the emitted light beam one time. This is the same structure as that of the first exemplary embodiment of the present invention, but is distinct in that the first, second, and third reflection mirrors 111, 121, 131 reflect light in the opposite direction. That is, the light beam of the first light source device 110 is reflected through the first reflection mirror 111 in the left direction of the light beam and thus enters into the image unit 150, and also the light beam of the second and third light source devices 120, 130 is reflected through the second and third reflection mirrors 121, 131 in the left direction of the light beam and thus enters into the image unit 150.

Figure 4:
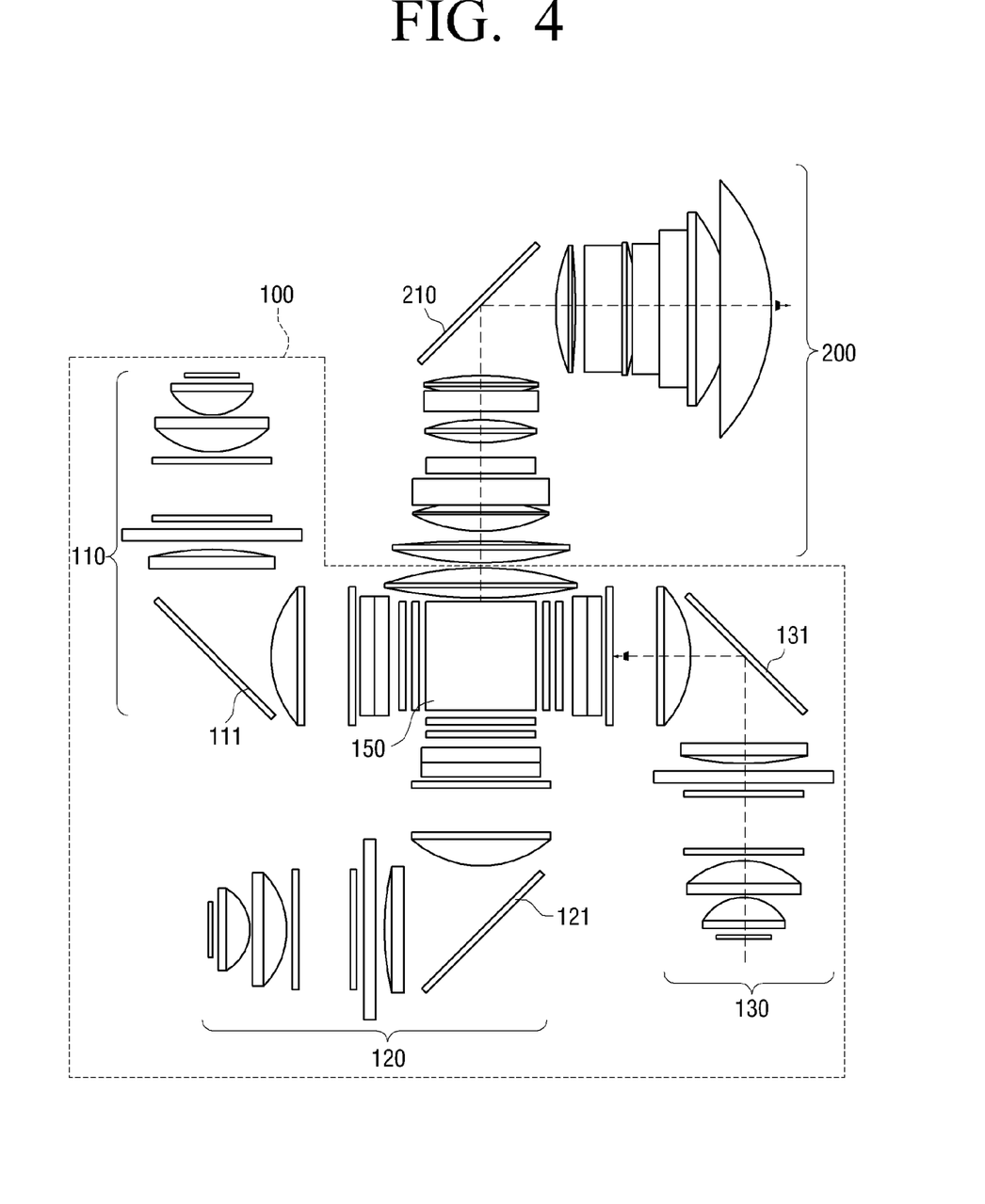
FIG. 4 is a schematic view illustrating an optical system according to a fourth exemplary embodiment of the present invention.

FIG. 4 is a schematic view illustrating an optical system according to a fourth exemplary embodiment of the present invention. According to the fourth exemplary embodiment of the present invention, in addition to the first, second, and third light source devices 110, 120, 130 in the luminous system 100 according to the third exemplary embodiment of the present invention, a fourth reflection mirror 210 is mounted in the projection system 200 as shown in FIG. 4, and may reflect light having an image projected from the image unit 150 one time and project the light on a screen (not shown). The fourth reflection mirror 210 reflects the light having the image in the right direction of the proceeding light.

Figure 5:
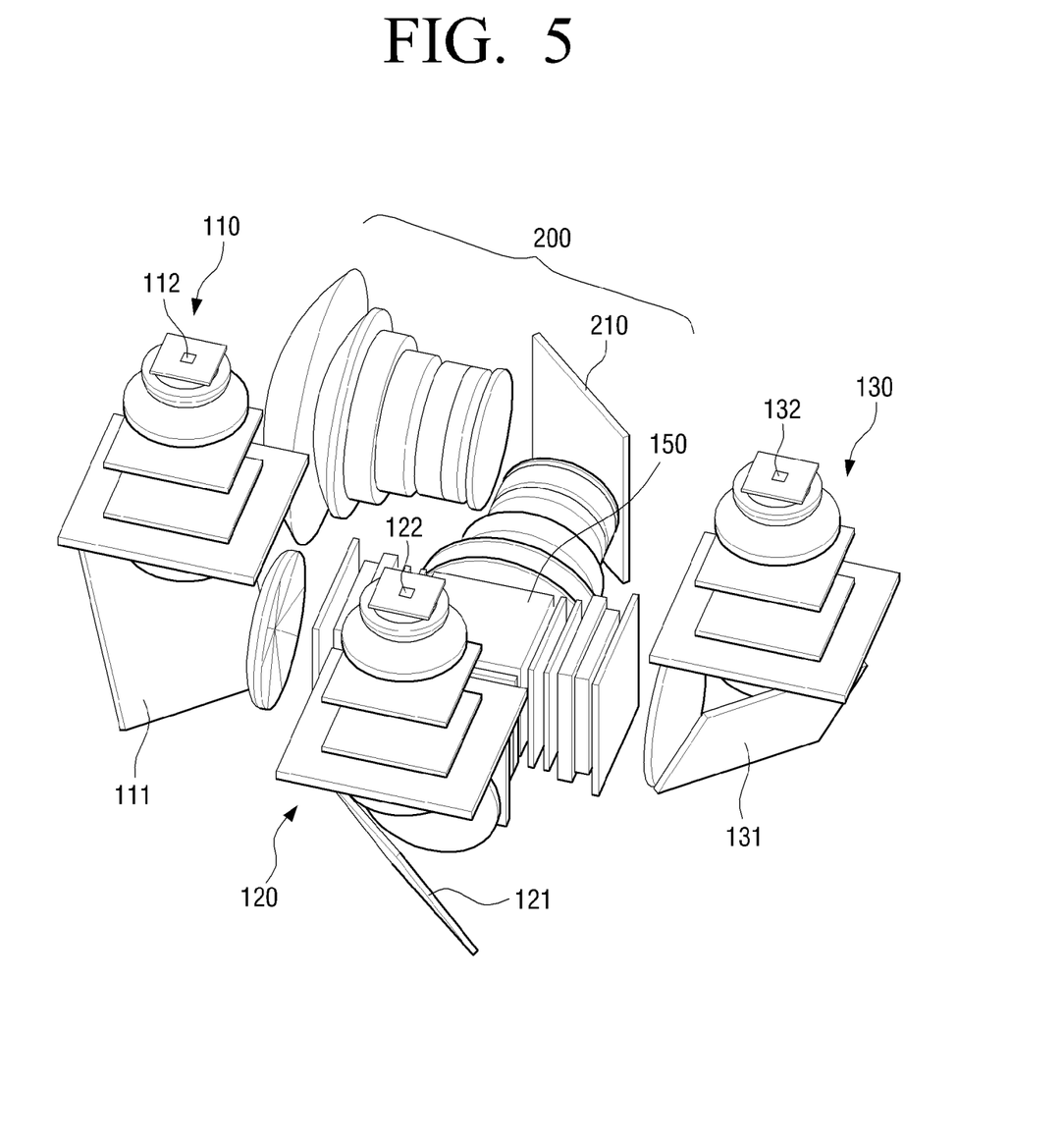
FIGS. 5 and 6 are schematic views illustrating an optical system according to a fifth exemplary embodiment of the present invention.
Figure 6:
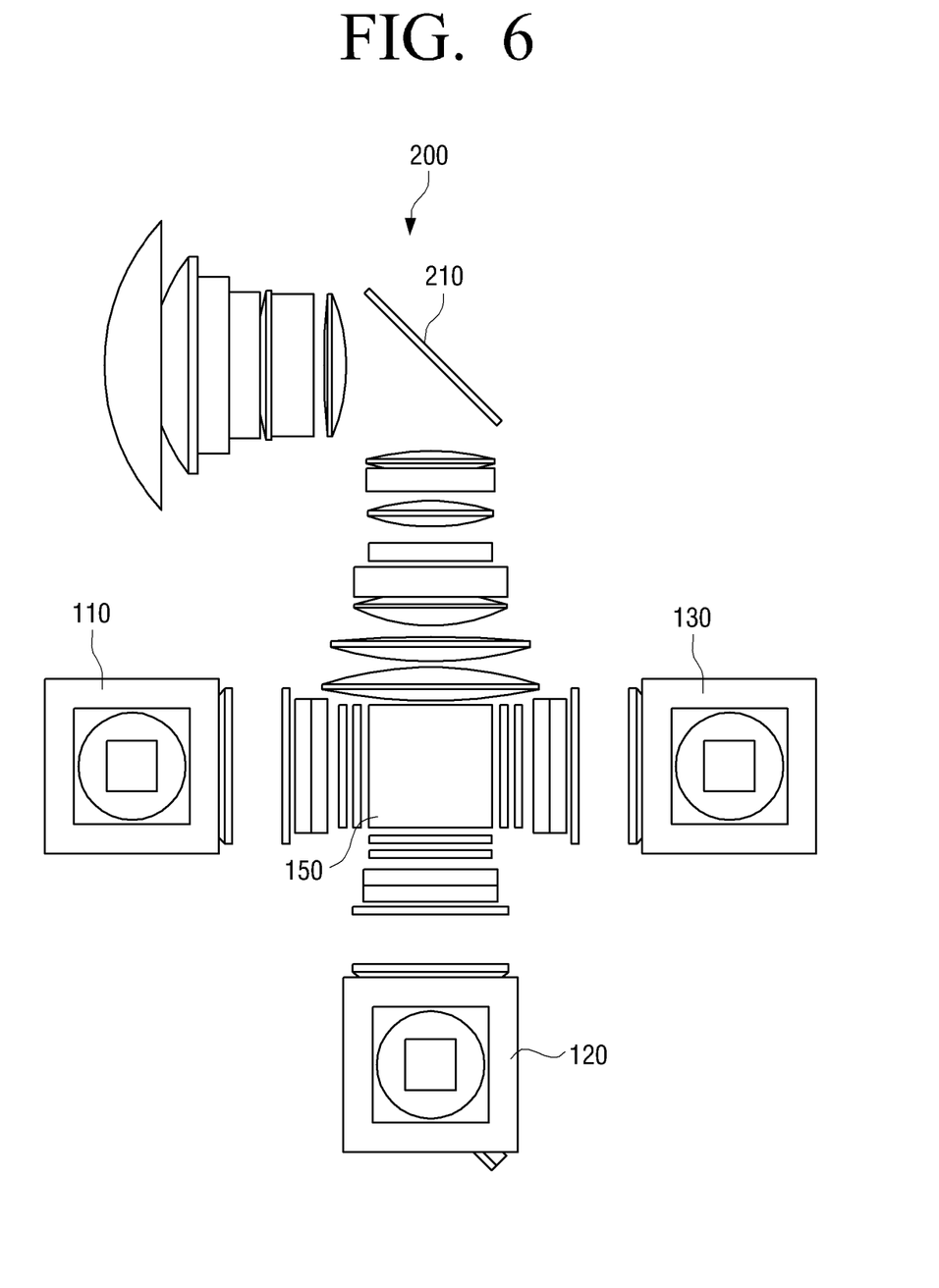

FIGS. 5 and 6 are schematic views illustrating an optical system according to a fifth exemplary embodiment of the present invention. An optical system according to the fifth exemplary embodiment of the present invention comprises first, second, and third light beam generators 112, 122, 132 disposed on the first, second, and third light source devices 110, 120 130, and the image unit 150. The first, second, and third light beam generators 112, 122, 132 are disposed in the height different from that of the image unit 150 as shown in FIGS. 5 and 6. Each of the first, second, and third light beam generators 112, 122, 132 and the projection system 200 comprises first, second, third, and fourth reflection mirrors 111, 121, 131, 210 respectively, and they are configured to reflect light moving along the light beam path once.

The first, second, and third light beam generators 112, 122, 132 are disposed at a position higher than the image unit 150, and the first, second, and third reflection mirrors 111 are disposed under the first, second, and third light beam generators 111, 122, 132 and thus the first, second, and third light beam generators 111, 122, 132 project parallel light beam downwardly. The light beam is reflected through the first, second, and third reflection mirrors 111, 121, 131 one time, and input to the image unit 150.

If the first, second, and third light source devices 110, 120, 130 are configured as described above, the height of the device is high, but the width and length of the device may be reduced as shown in FIG. 6.

Figure 7:
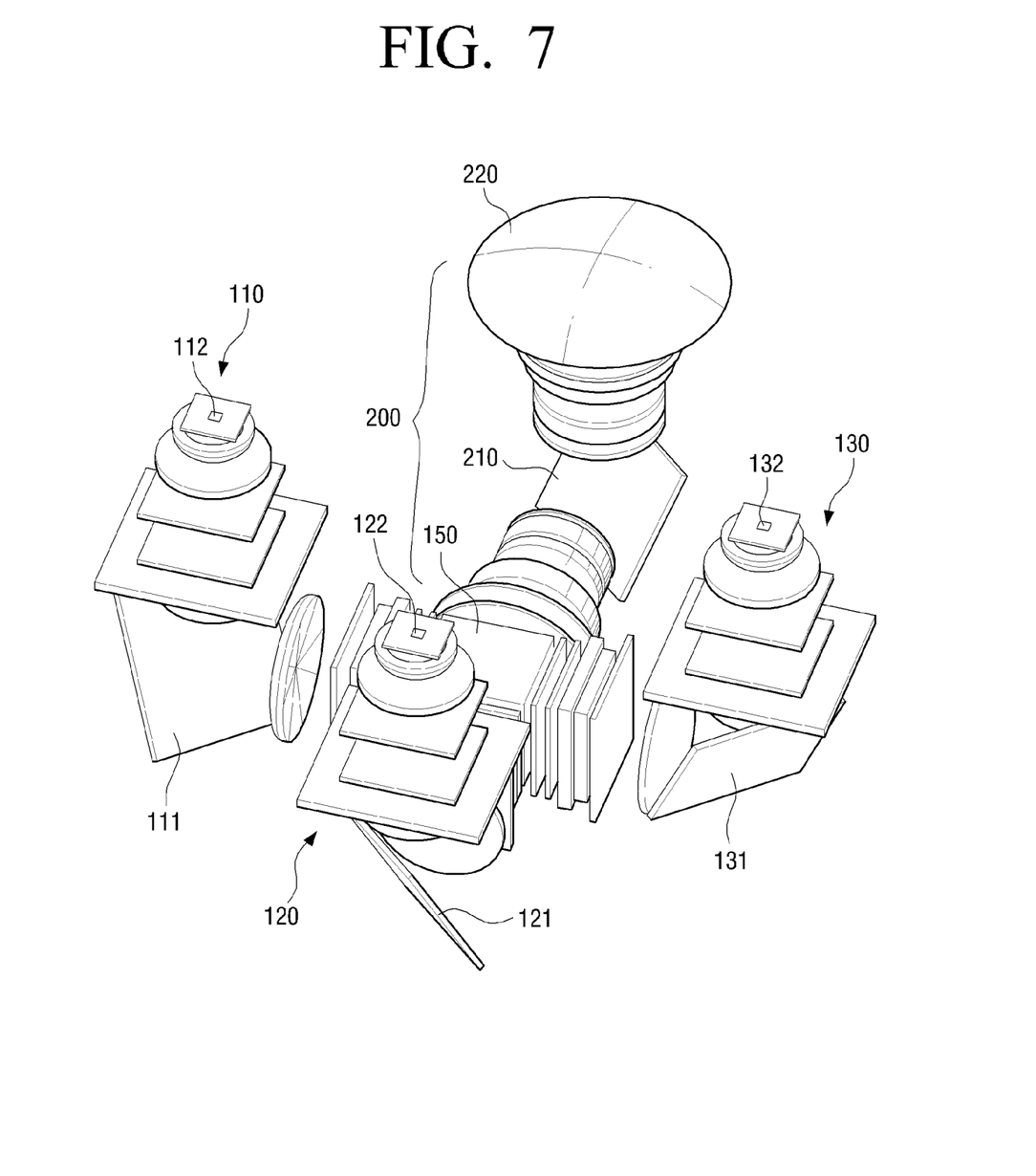
FIGS. 7 and 8 are schematic views illustrating an optical system according to a sixth exemplary embodiment of the present invention.
Figure 8:
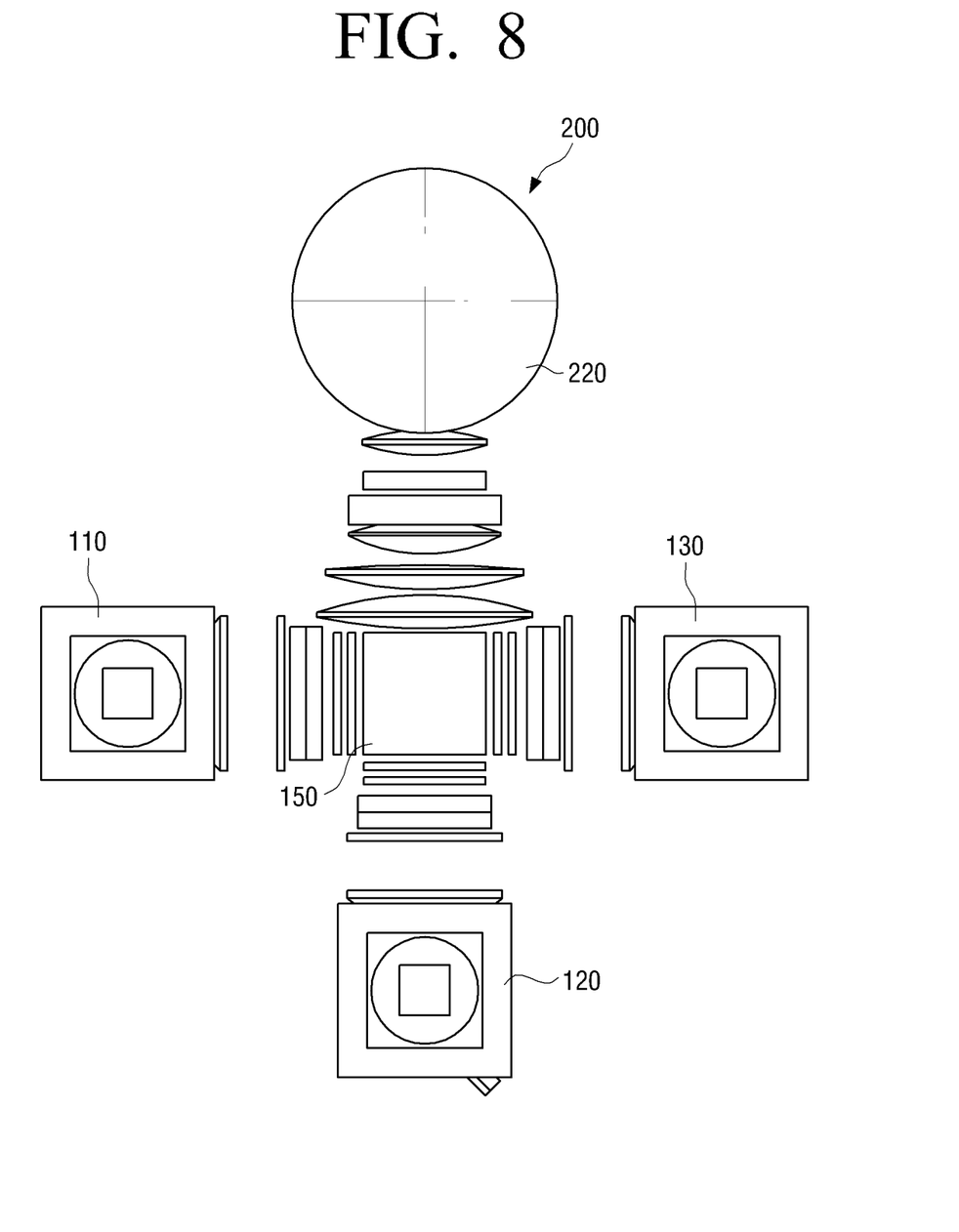

An optical system according to the sixth exemplary embodiment of the present invention comprises the first, second, and third light beam generators 112, 122, 132 disposed on the first, second, and third light source devices 110, 120 130, and the projection system 200. The first, second, and third light beam generators 112, 122, 132 are disposed in the height different from that of the image unit 150 as shown in FIGS. 7 and 8. The first, second, third, and fourth reflection mirrors 111, 121, 131, 210 are disposed under the first, second, and third light beam generators 112, 122, 132 and a projection lens 220 of the projection system 200. The light beam is reflected by the first, second, and third reflection mirrors 111, 121, 131 one time and enters to the image unit 150, and the light having an image projected from the image unit 150 is reflected by the fourth reflection mirror 210 one time and input to a screen (not shown) through the projection lens 220.

FIGS. 7 and 8 are schematic views illustrating an optical system according to a sixth exemplary embodiment of the present invention. The optical system according to the sixth exemplary embodiment of the present invention is distinct from that of the fifth exemplary embodiment of the present invention, in terms of the direction of the light having an image emitted through the projection lens 220. That is, the light beam emitted from the light beam generators 112, 122, 132 of the first, second, and third light source devices 110, 120, 130 toward the first, second, and third reflection mirrors 111, 121, 131 is parallel with the light having an image being reflected by the fourth reflection mirror 210 and being emitted through the projection lens 220 as shown in FIG. 7.

According to the exemplary embodiments of the present invention, as the light source devices and the projection system are configured using as little space as possible in a body of the optical system, a small-sized device such as a microminiature portable projection device may be configured in a compact size. Moreover, if the optical system according to the exemplary embodiments of the present invention is applied to a portable device having the image unit 150 which needs three-color light sources such as a thin film transistor liquid crystal display (TFT-LCD), the portable device may be easily configured in a small size.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical system, comprising:
a luminous system which comprises a plurality of light source devices and an image unit; and
a projection system which receives light from the luminous system, and enlarges and projects the light,
wherein each of the plurality of light source devices comprises: a light source, a reflection member which reflects light emitted from the light source, wherein the light source and the reflection member are disposed such that the light emitted from the light source is reflected exactly once prior to being incident on the image unit,
wherein the projection system comprises an image reflection member which reflects the light from the image unit, and
wherein the light sources of the plurality of light source devices and the image reflection member are disposed such that the light emitted from each of the light sources toward a corresponding reflection member is parallel with the light being reflected by the image reflection member.

2. The optical system as claimed in claim 1, wherein, in each of the plurality of light source devices, the reflection member is disposed such that the light emitted from the light source is reflected in a same direction.

3. The optical system as claimed in claim 2, wherein the image reflection member reflects the light from the luminous system exactly one time.

4. An optical system, comprising:
a luminous system which comprises:
a plurality of light source devices each of the plurality of light source devices comprising a light beam generator and a reflection member which reflects a light beam emitted from the light beam generator;
an image unit; and
a projection system which enlarges and projects light received from the image unit,
wherein, in each of the plurality of light source devices, a height of the light beam generator is different from a height of the image unit, and the light beam generator and the reflection member are disposed such that the light beam emitted from the light beam generator is reflected exactly once, by the reflection member, prior to being incident on the image unit,
wherein the projection system comprises an image reflection member which reflects the light from the image unit, and
wherein the light beam generators of the plurality of light source devices and the image reflection member are disposed such that the light emitted from each of the light beam generators toward a corresponding reflection member is parallel with the light being reflected by the image reflection member.

5. The optical system as claimed in claim 4, wherein, in each of the plurality of light source devices, the height of the light beam generator is greater than the height of the image unit.

6. The optical system as claimed in claim 5, wherein the image reflection member reflects the light received from the image unit exactly one time.

7. The optical system as claimed in claim 6, wherein the projection system comprises a projection lens,
wherein the projection lens projects light incident thereon and a height of the projection lens is different from the height of the image unit.

8. The optical system as claimed in claim 7, wherein the height of the projection lens is greater than the height of the image unit.

9. An optical system, comprising:
a plurality of light source devices which each emit a light beam;
an image unit which receives light beams emitted from the plurality of light source devices and emits light; and
a projection system which receives light emitted from the image unit and projects the light,
wherein each of the plurality of light source devices comprises: a light source, a reflection member which reflects light emitted from the light source, wherein the light source and the reflection member are disposed such that the light emitted from the light source is reflected exactly once prior to being incident on the image unit, and
wherein, in each of the plurality of light source devices, the reflection member reflects light incident thereon in a same direction,
wherein the projection system comprises an image reflection member which reflects the light from the image unit, and
wherein the light sources of the plurality of light source devices and the image reflection member are disposed such that the light emitted from each of the light sources towards a corresponding reflection member is parallel with the light being reflected by the image reflection member.

10. The optical system according to claim 9, wherein a first light source of a first light source device of the plurality of light source devices emits light in a first direction, a second light source of a second light source device of the plurality of light source devices emits light in a second direction which is parallel to the first direction, and a third light source of a third light source device of the plurality of light source devices emits light in a third direction which is parallel to the first direction.

11. The optical system according to claim 9, wherein the image reflection member is disposed so that the light from the image unit is reflected exactly one time in the projection system.

* * * * *